United States Patent [19]

Van Sorge

[11] 3,764,630

[45] Oct. 9, 1973

[54] ALKYLATION PROCESS

[75] Inventor: Bernardus J. Van Sorge, Selkirk, N.Y.

[73] Assignee: General Electric Company, Pittsfield, Mass.

[22] Filed: July 22, 1970

[21] Appl. No.: 57,357

[52] U.S. Cl.......... 260/621 R, 260/619 R, 260/620, 260/624 C
[51] Int. Cl............................................. G07c 39/06
[58] Field of Search .................... 260/621 R, 624 C, 260/620, 619; 252/467, 468

[56] References Cited
UNITED STATES PATENTS

| | | | |
|---|---|---|---|
| 3,446,856 | 5/1969 | Hamilton | 260/621 R |
| 2,678,951 | 5/1954 | Smith et al. | 260/620 UX |
| 2,103,736 | 12/1937 | Skroup | 260/624 C |
| 2,572,019 | 10/1951 | Fawcett et al. | 260/612 D |
| 2,448,942 | 9/1948 | Winkler et al. | 260/621 R |

FOREIGN PATENTS OR APPLICATIONS

| | | | |
|---|---|---|---|
| 4,427,367 | 11/1969 | Japan | 260/621 R |
| 717,588 | 10/1954 | Great Britain | 260/621 R |

OTHER PUBLICATIONS

Derwent Belgium Report 81A p. A1 No. 603254 9/1/61

*Primary Examiner*—Howard T. Mars
*Attorney*—William F. Muffatti, Morgan, Finnegan, Durham and Pine, Frank L. Neuhauser, Oscar B. Waddell and Joseph B. Forman

[57] ABSTRACT

There is provided a process for selectively alkylating a phenolic compound in the orthoposition to the significant reduction of alkylation in the meta- and para-positions which comprises alkylating the phenolic compound with an alkanol in the presence of water and a molybdenum catalyst in admixture with magnesium oxide, in the vapor phase at a temperature of from 200° to 600°C.

16 Claims, No Drawings

ALKYLATION PROCESS

This invention relates to the alkylation of phenolic compounds. More particularly, it contemplates the alkylation of the ortho-position of phenols having at least one ortho-hydrogen.

BACKGROUND OF THE INVENTION

The methylation of phenols having at least one ortho-hydrogen, i.e., at least one unsubstituted ortho-position, for example, phenol, cresol, i.e., o-cresol, m-cresol, p-cresol, 2,4-xylenol, 2,3-xylenol, 3,5-xylenol, and the like, is old in the art.

Winkler et al, U.S. Pat. No. 2,448,942, for example, discloses alkylation of phenols in the vapor phase at 300°–450°C. using either alcohols or ethers as the alkylating agent and metal oxides, such as aluminum oxide, thorium oxide, zirconium oxide, zinc oxide, iron oxide, chromium oxide, manganese oxide, magnesium oxide, calcium oxide and barium oxide. Winkler et al's process is especially useful to fully methylate phenol and to prepare, e.g., pentamethyl phenol. The preferred catalyst is aluminum oxide. The Winkler et al process, however, is somewhat indiscriminate and lacks specificity for ortho-alkylation to the relative exclusion of alkylation in the meta- and para-positions.

In Kunz, U.K. Pat. No. 717,588, there is described a process somewhat similar to the Winkler et al process in that the same metal oxides are used, aluminum oxide being preferred, with ortho-cresol being the starting material to be alkylated with methanol. Both meta- and para-cresol are found in the products of the Kunz process indicating either a lack of specificity for ortho-alkylation or rearrangement of ortho-methyl substituents during the reaction.

Biller, U.S. Pat. No. 3,439,048, discloses the alkylation of phenol with methanol or dimethyl ether in the presence of an aqueous solution of zinc halide to obtain m-cresol-free methyl phenol mixtures. Although the products contain predominantly o-cresol, substantial amounts of p-cresol and 2,4-xylenol are found in the reaction products. Thus the Biller process apparently permits either production of para-substituted phenols or rearrangements of isomeric cresols and xylenols, indicating a lack of specificity for ortho-alkylation.

Hamilton, U.S. Pat. No. 3,446,856, discloses that one particular metal oxide, i.e., magnesium oxide, is capable of promoting the formation of ortho-alkylated phenols to the exclusion of isomeric byproducts if temperatures are employed which are substantially higher than the 300°–450°C. range used by Winkler et al. The Hamilton patent contains data showing that at 370°C., an exemplary Winkler et al temperature, aluminum oxide is a much more reactive catalyst for the alkylation of phenol with methanol than is magnesium oxide. On the other hand, at 530°C. magnesium oxide was surprisingly found to be much more active than aluminum oxide.

The Hamilton patent teaches that the beneficial results, i.e., high selectivity for ortho-alkylation, are obtained with magnesium oxide only at temperatures between 475°C. and 600°C. and in practice it has developed that the conventional operating temperature will be about 500°–550°C.

With respect to the range 475° to 600°C., the Hamilton patent teaches that yields of only about 3 percent of alkylated phenol are obtained at 475°C. unless formaldehyde is added to the phenol. Even if formaldehyde is added, which is an embodiment of the Hamilton patent, the yield of alkylated phenol at 475°C. increases only to 30 percent and even at 500°C. it is disclosed to be necessary to add formaldehyde to the methanol to increase the yield from 13 to 39 percent.

At 500°C. and at 550°C., the Hamilton patent discloses, it is possible to modify the magnesium oxide catalyst so that the activity and the selectivity, i.e., for ortho-alkylation to the relative exclusion of isomer formation, both can be changed. Such a modification will be achieved, in highly unpredictable fashion, by mixing magnesium oxide with anions, such as sulfate, phosphate, chloride, and the like; acidic oxides, such as aluminum oxide, silicon dioxide, and the like; and cations, such as zinc, lead, iron, and the like. The Hamilton patent discloses that the molybdate anion, $MoO_3^-$, added to magnesium oxide at 1 percent by weight, effected an increase in conversion at 500°C. but a decrease in conversion at 550°C. and a decrease in selectivity at both temperatures. Thus 1 percent by weight of molybdate anion in magnesium oxide acted as a mild promotor at one temperature and an anti-catalyst at another and this at the expense of decreased selectivity in both instances.

The process disclosed in the Hamilton patent provides phenols selectively methylated in the ortho-position, to the significant retardation of methylation in the meta- and para-positions, in an unexpectedly efficient manner. However, the process has several disadvantageous aspects. As has been mentioned, unless formaldehyde is mixed with the methanol feed, the minimum temperature, 475°C. will give unacceptable yields of alkylated phenol — 3 percent by weight. If the reaction temperature is increased to a level to increase the yield, e.g., 525°–550°C., then there is a tendency for corrosion to shorten the life of reactor tubes made of common engineering materials. Furthermore, for reasons not clearly understood at this time, the magnesium oxide catalyst has a somewhat shorter than desired useful life and it must be taken out of service and regenerated after about 70 to 90 hours. In addition, the magnesium oxide catalyst of the Hamilton patent appears to cause decomposition of at least part of the methanol feed at the temperatures necessary for the process and this makes some of the reactant unavailable for phenol alkylation and thus increases the overall cost of the product.

Thus in the present state of the art, the alkylation of phenols with alcohols is promoted with aluminum oxide catalysts at 300° to 450°C. at superatmospheric pressure, but selectivity with such catalysts for ortho-alkylation is poor, apparently because the products rearrange easily to isomers. If orthocresol is substituted for phenol, the amount of di-ortho alkylated product is increased but significant amounts of meta- and para-alkylated byproducts still are formed. Substituting magnesium oxide for aluminum oxide increases the selectivity for orthosubstitution but requires higher reaction temperatures or mixing the alcohol with formaldehyde. Such catalysts are relatively short-lived, cause some of the alcohol to decompose, and adding ions and oxides to them leads to unpredictable results in terms of increasing activity. In any event, such modifications cause selectivity for ortho-alkylation to be reduced.

The ortho-alkylated phenols provided by such processes have valuable properties. They may be used, for example, in making bisphenols, or as stabilizers for gasoline or other fuels for internal combustion engines. They are particularly useful in making polyarylene ethers, a valuable class of thermoplastic polymers disclosed and claimed, for example, in A. S. Hay, U.S. Pat. No. 3,306,875. As is disclosed in the Hay patent, polyphenylene ethers having the highest molecular weight and most desirable properties are prepared from mono- or di-ortho substituted phenols having an unsubstituted para-position, which joins with the phenolic hydrogen in a similar molecule to form polymeric chains.

In view of the state of the art and the valuable properties of the products it would be very desirable to provide an improved process to prepare preferred ortho-substituted, para-unsubstituted phenolic compounds in which there is a selective direct introduction of alkyl groups in the ortho-position. Furthermore, it would be advantageous to provide such a process in which a rearrangement of the desired products to isomeric cresols and xylenols with para-substitution is remarkably suppressed. In addition, it would be desirable to provide such processes, with higher conversions, and with retained selectivity, at lower temperatures, with extended catalyst lives and decreased tendency to cause reactant losses through decomposition.

Unexpectedly, there has now been found a very convenient process for producing high yields (high degree of conversion) of mono-o-alkyl or di-o-alkyl phenols with a very high degree of ortho-selectivity, i.e., a high proportion of the starting phenol is converted to products in which alkylation has occurred at only one or both of the ortho-positions. In addition, the other above-mentioned disadvantages of the prior art processes are substantially reduced or eliminated.

DESCRIPTION OF THE INVENTION

According to the present invention there is provided a process for selectively alkylating a phenolic compound in the ortho-position to the significant retardation of alkylation in the meta- and para-positions which comprises alkylating the phenolic compound with an alkanol in the presence of water and a molybdenum compound in admixture with magnesium oxide.

Such a process, in essence, comprises alkylating a phenolic compound having at least one ortho-hydrogen by reacting said phenolic compound with an alkanol in the presence of water and a catalytically active compound selected from the group consisting of molybdenum oxide and salts of molybdic acid in admixture with magnesium oxide, in the vapor phase at a temperature of from about 200°C. to about 600°C., and preferably from about 200°C. to about 490°C. The pressure can be sub-atmospheric, atmospheric or superatmospheric.

Illustrative phenolic compounds used as starting materials are of the general formula

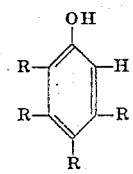

wherein each R is a monovalent substituent such as hydrogen, 1 – 12 C alkyl, aryl, and alkylaryl, e.g., methyl, ethyl, n-propyl, phenyl, o-methylphenyl, p-methylphenyl, 2,6-xylyl, and the like. Especially useful starting materials are phenol (R is hydrogen), o-cresol, m-cresol, p-cresol, o-phenylphenol and 3,5-xylenol. Phenol is a preferred starting material.

Suitable alkanols may be represented by the formula $$R^1-OH$$

wherein $R^1$ is saturated alkyl of up to about 12 carbon atoms, straight chain or branched chain. Illustrative alkanols are those wherein $R^1$ is methyl, ethyl, n-propyl, i-propyl, n-butyl, t-butyl, hexyl, octyl, 2-ethylhexyl, decyl and dodecyl. Preferred alkanols are (lower)alkanols, i.e., those in which $R^1$ contains from about 1 to about 6 carbon atoms, such as methyl, ethyl, propyl, isopropyl, butyl, isobutyl, tertiary butyl, amyl and hexyl alcohols. Especially preferred as the alkanol is methanol.

The catalytically-active compounds of this invention comprise controlled amounts of molybdenum values, i.e., compounds, in admixture with magnesium oxide. The molybdenum values are preferably in the form of molybdenum oxide and salts of molybdic acid. The admixture of molybdenum values with magnesium oxide provides a catalyst more advantageous for the alkylation of phenolic compounds than either component alone, regardless of the reaction conditions used. It has been found that not less than about 2 percent by weight of molybdenum values in the mixture affords especially advantageous results. Lower amounts can be employed but then reaction temperatures toward the higher end of the range are needed and some of the advantages provided by lower temperatures are lost. On the other hand, there seems to be no essential upper limit to the amount of molybdenum values in the catalyst, the question then becoming one primarily of economics — since magnesium oxide is the less expensive of the two — and ease of handling.

The molybdenum values may be introduced into the catalytically-active compound by mixing solid forms, e.g., salts or oxides of molybdenum with magnesium oxide. The molybdenum values may most conveniently be introduced by soaking magnesium oxide in an aqueous solution of molybdic acid or any water-soluble salt of molybdic acid, such as the alkali metal or alkaline earth metal, the ammonium or the heavy metal salts to be illustrated hereinafter, the amount and concentration of the solution being controlled so as to introduce any desired amount of molybdenum values. Alternatively, the molybdenum may be introduced into the magnesium oxide during the process of its manufacture. In any case, it is desirable that the magnesium oxide contain at least about 2 percent and preferably from about 2 to about 10 percent by weight of molybdenum values, and this preferably either impregnated in or coated on the surface of the magnesium oxide. In making the catalytically-active compounds, it is usually preferable to use solutions of molybdenum compounds which decompose on heating, for example, on calcining, to yield molybdenum oxide and to carry out such decompositions before using the catalytically-active compound in the process of the invention. However, the decomposition may be effected simultaneously with the alkylation reaction where the decomposition products do not unduly complicate product recovery.

Any form of molybdenum oxide, e.g., molybdenum dioxide, $MoO_2$, or sesquioxide, $Mo_2O_5$ or trioxide, $MoO_3$, or in general, any salt of molybdic acid, $H_2MoO_4$, is suitable for use in this process. Molybdic acid itself can be mixed with magnesium oxide to give an active catalyst. It is preferred that significant amounts of aluminum oxide and silicon oxide should be absent. These tend to decrease selectivity.

Suitable salts of molybdic acid can be those of trivalent or hexavalent molybdenum and, in general, they will be of the formulae $M_2(MoO_4)$ or $M_2Mo_2O_7$, i.e., corresponding to the chromates and bichromates, respectively, or they will be more complex, such as $M_6Mo_7O_{24}$. In the simpler salts M will represent a metal cation derived, for example, from the alkali metals, e.g., sodium, potassium, lithium or the alkaline earth metals, e.g., calcium or magnesium, and the like. The more complex formulas are illustrated by ammonium para-molybdate.

It is an essential feature of the present process to carry out the reaction of phenolic compound and alkanol in the presence of water. In comparative experiments, replacement of the water by toluene (on a molar basis and operating at the same vapor space velocity) resulted in such a decrease in catalyst life that it was only about one-half that of the prior art catalysts. Since the prior art catalysts aredisadvantageous because of such short lives, all of the desired results provided by the present process are not obtained unless waTer is present in the reaction mixture.

The amount of water selected to secure the extended catalyst life and other critical advantages can vary considerably. For example, the amount of water can comprise from about 1 to about 99 percent by volume based on the combined volume of phenolic compound, alkanol and water. It is preferred to use from about 10 to about 75 percent by volume of water, and especially preferred to use about 50 percent by volume of water based on the combined volume of phenolic compound, alkanol and water.

The reaction can be carried out in the conventional type of reactor used for vapor phase reactions over a solid catalyst. Generally used is a tubular reactor, for example, a glass or metal tube which is filled with a static bed of catalytic compound. The reactor is heated by any conventional means; for example, it is conveniently heated either by surrounding the reactor with an electrical heater, a heated glass, or a liquid such as a fused salt bath, liquid metal, etc., which can be conveniently maintained at reaction temperature by use of immersion-type electrical heaters. Because of the good heat transfer between a liquid and the reactor walls, a fused salt bath or other liquid medium generally gives the best temperature control of the reaction, although any means of heating may be used. Alternatively, a fluid bed reactor may be used. The reaction of alkanol with phenolic compound is exothermic and therefore, it is desirable to control the catalyst bed temperature by using a control temperature on the heaters which is somewhat less than the desired bed temperature of the catalyst and allowing the heat of the exothermic reaction to keep the catalyst bed temperature at the slightly higher desired temperature.

The alkanol, phenolic compound and water can be mixed to form a solution which is then vaporized or separate streams of the two reactants and water may be fed to the same or separate vaporizers and then to the reactor. In order to minimize decomposition in the vaporization of the reactants, the vaporizer may be maintained at a minimum temperature necessary to vaporize the reactants and the vapor of the reactants and water preheated prior to entering the reactor by passing through a metal or glass tube which is heated by the same heating medium used to heat the reactor. In this way no cooling of the initial part of the reactor occurs due to the necessity of heating the reactants and water up to the reaction temperature.

Any one or a mixture of the above-illustrated phenolic compouns together with the alkanol and water is vaporized and passed through a reactor containing the catalyst maintaining a temperature in the range of 200°–600°C. In order to obtain the maximum yield of ortho-alkylated products, there is used at least one mole of alkanol and preferably from 1 to 3 moles of alkanol for each ortho-position in the phenol to be alkylated. For example, if phenol is to be methylated to produce a maximum yield of 2,6-dimethylphenol(2,6-xylenol), it is preferred to use 2 to 6 moles of methanol for each mole of phenol with maximum yields being obtained with the higher ratio, i.e., 4 to 6 moles of methanol to 1 mole of phenol. surprisingly enough, with these high ratios of methanol to phenol, an extremely small amount of 2,4,6-trimethylphenol and other higher methylated phenols are produced. In other words, the process is capable of selectively alkylating the above phenols in the ortho-position to the significant retardation of alkylation in the other positions, even in the presence of excess alkanol. Most of the excess alkanol which is used is recovered unchanged in the reaction product mixture from which it may be recovered and reused as can also any unreacted phenolic and any o-monoalkylphenol which has been either added or formed in the reaction.

The vapors issuing from the reactor are condensed in the usual fashion and the products separated in the usual fashion, for example, by crystallization, distillation, etc. The reaction proceeds smoothly at atmospheric pressure which makes it convenient to carry out the reaction since it eliminates the need for pressure equipment and any hazards from the use of high pressure. Pressures above or below atmospheric pressure, however, can be used.

As will be apparent to those skilled in the art, the process can be carried out under a variety of reaction conditions. These conditions are temperature, pressure, flow rate of reactants, vapor space velocity of the reactants over the catalyst, contact time of the reactants with the catalyst, length of the catalyst bed, specific activity of the particular catalyst, etc. The effects of these reaction variables are those to be expected from a consideration of the technical aspects of the reaction involved. For example, the reaction of methanol with the phenol to produce the desired methylated products proceeds faster as the catalyst bed temperature is increased providing that the temperature is not so high that secondary reactions such as decomposition of the reactants or products occur to decrease the yield of desired product. Such secondary reactions do not occur to any appreciable extent in this reaction up to a temperature of 600°C. Above 600°C., decomposition of the reactants and product becomes a problem because it deposits carbon on the catalyst, decreasing its activity. In contrast to prior art catalysts, in the range of from 275°–600°C., when using a high proportion of methanol to phenol, i.e., 2-3 times the amount of methanol required to methylate each ortho-position of the phenol, the tendency to decompose methanol to gaseous products is decreased. Below a temperature of 200°C., the reaction of methanol with the phenol is so slow that the yield of product per hour per volume of catalyst is so low as to make the reaction uneconomical to carry out, regardless of the reaction conditions.

In accordance with well known techniques to compensate for lower rates of reaction, if for example, less reactive phenolic compounds or alkanols are used, a longer contact time of the reactants with the catalyst can be used. This may be done by changing any one or several of the variables which decrease the vapor space velocity of the reactants over the catalyst, thus increasing the contact time. Examples of this are increasing the amounts of catalyst, decreasing the flow rate of reactants, increasing the pressure in the reactor, etc. At the lower flow rates, there is some tendency for the selectivity to decrease because the longer contact time does permit any product which has been completely substituted in the two ortho-positions in the initial part of the reaction to have time to react further to produce some para-substituted product. This loss in selectivity can be compensated by increasing the space velocity but not the flow rate of reactants by using an inert diluent for the reactants; for example, an inert gas, i.e., nitrogen, argon, etc., or an inert vapor, i.e., benzene, toluene, etc., or by using a lower pressure in the reactor.

If it is desired to use pressure, the flow rate of the reactants can be increased to give an equal contact time. It, of course, will be recognized that it is possible to have a flow rate of reactants so great, either with or without pressure, that the catalyst is effectively "flooded" with reactant vapor so that it does not come in contact with the catalyst and react.

Generally, reaction conditions are chosen so as to minimize the amount of unreacted feed materials which must be recovered and reused. However, reaction conditions which on the face might appear undesirable from an over-all yield point of view may be desirable from an economic point of view because of the very high degree of selectivity of the reaction under such conditions to give exclusively only ortho-alkylated products. On the other hand, reaction conditions can also be adjusted to give high over-all yields in terms of pounds of ortho-alkylated product per hour per volume of catalyst when a very small yield of para-substituted product can be tolerated.

It will also be recognized that, because of differences in the specific activities of the catalysts, each particular catalyst will have different optimum reaction conditions than another catalyst. The more reactive the catalyst, the shorter the contact time needs to be to give the same degree of conversion to orthoalkylated products. Therefore, a higher space velocity or a lower temperature may be used with a more reactive catalyst. It has been found that a catalyst which has not been used in the reaction or has been regenerated has an induction period during which time the activity of the catalyst increases until it reaches a maximum activity which it maintains for a long period of time. Therefore, catalyst activity should not be measured until this steady state condition is obtained.

In its most preferred embodiment, it will be seen that this invention provides a very flexible process for the ortho-methylation of phenols. Using molybdenum values admixed with magnesium oxide as the catalyst, methanol can be reacted with a phenol having hydrogen in at least one ortho-position, and water, as the essential ingredients, in the temperature range of 200° to 600°C. under a variety of pressure, space velocity and flow conditions with or without the use of diluents to give a high conversion of the phenol to methylated products with a very high degree of selectivity for the methylation to occur at the ortho-position.

In its most preferred aspects, the molybdenum values will be provided as ammonium para-molybdate and the temperature of the reaction will be between about 200° and about 490°C., preferably from about 430° to about 450° C. Moreover, in such a process, the amount of water will most preferably comprise from about 10 to about 75 percent and especially preferably about 50 percent by volume based on the combined volume of phenol, methanol and water. Furthermore, in such a preferred embodiment, the catalytic mixture contains from about 2 to about 10 percent by weight of molybdenum values and the catalyst has been heated and/or calcined at a temperature of at least about 200°C. before use.

Description of the Preferred Embodiments

In order that those skilled in the art may better understand the invention, the following examples are given by way of illustration and not by way of limitation.

EXAMPLE 1

The reactor consists of a reservoir containing a solution of methanol, water and phenol, connected to a metering pump which feeds the reactants through ¼ inch stainless steel tubing to a vaporizer made from a 12 inch long piece of 1¼ inch O.D., 1 inch I.D. stainless steel tubing. The vaporizer is surrounded by an electrical heater maintained at 350°C. The vapors from the vaporizer are fed through ¼ inch diameter stainless steel tubing to the bottom of a vertical 24 inch long piece of 1¼ inch O.D., 1 inch I.D. stainless steel tube reactor. The reactor is immersed in a fused salt bath to a depth of about 20 inches. Since the inlet tube for the reactants coming from the vaporizer also is passed through the fused salt bath, it serves as a preheater to preheat the vapor issuing from the vaporizer up to the temperature of the reactor. The reactor is equipped with a thermowell made from ¼ inch stainless steel tubing concentrically located for the entire length of the reactor so that the catalyst bed temperature can be measured through the entire length of the tube. The reactor tube is filled with about 20 ml. of glass beads and then 100 ml. of catalyst is introduced which fills the tube to a depth of about 18 inches. The product vapors from the reactor are led to a water-cooled condenser and receiver.

The catalyst has been prepared as follows: 198 grams of magnesium oxide (0601 T, from Harshaw) is calcined at about 300°C. for 4 hours and placed in a desiccator to cool. Ammonium para-molybdate [12.28 g., $(NH_4)_6Mo_7O_{24} \cdot 4H_2O$] is dissolved in 100 ml. of demineralized water and the solution is added to the warm (about 80°C.) magnesium oxide. After evaporating the water on a hot plate overnight (no boiling) the impregnated catalyst is calcined for about 2 hours at 300°C. The $MoO_3$ content lies in the range of 4 to 5 percent.

One hundred ml. of this catalyst is transferred to the reactor and at a liquid head space velocity (LHSV) of 1.0, a temperature of 440°–445°C, under atmospheric pressure and with a feed of a 1:1 phenol-methanol to water mixture, of which the MeOH:PhOH mole ratio is 5, the product distribution after 52 hours is as follows:

| | |
|---|---|
| Total phenol (wt. %) | 31.0 |
| o-cresol | 32.6 |
| 2,6-xylenol | 32.4 |
| 2,4,6-mesitol | 4.0 |

The methanol decomposition is very low and amounts to about 0.12 ft³/hr. The catalyst does not show any sign of deactivation.

The run is continued for 500 hours with an average LHSV of 0.95 and average vapor space velocity (VSV) of 0.59 sec.⁻¹. The product distribution after 500 hrs. is as follows:

| | |
|---|---|
| Total phenol (wt. %) | 47.8 |
| o-cresol | 26.4 |
| 2,6-xylenol | 25.8 |
| 2,4,6-mesitol | 0.8 |

The methanol decomposition is very low and amounts to about 0.063 ft³/hr. The catalyst still does not show any sign of deactivation.

The ratio of 2,6/2,4,6 in the product is about 30:1, which indicates a high level of selectivity. During the first 40 hours of operation, some anisole and 2,4-xylenol is present in the product, but thereafter, no other byproducts are observed.

EXAMPLE 2

For comparison purposes, the procedure of Example 1 is repeated with magnesium oxide which has not been admixed with molybdenum values. The feed rate is 106 ml./hr. (LHSV 1.06 hr.⁻¹) and the VSV is 0.66. The product distribution after 21 hours is as follows:

| | |
|---|---|
| Total phenol (wt. %) | 64.8 |
| o-cresol | 28.8 |
| 2,6-xylenol | 5.8 |
| 2,4,6-xylenol | 0.6 |

The run was discontinued after 75 hours because the amount of 2,6-xylenol in the product had dropped to about 3 percent, indicating that the catalyst needed regeneration. After about 40 hours, from 5 to 7 times less 2,6-xylenol was being formed with this catalyst in comparison with that of Example 1.

EXAMPLE 3

The procedure of Example 1 is repeated, substituting for water, an equimolar amount of toluene. The toluene served as an inert diluent, replacing the water. In order to maintain about the same VSV of reactants over the catalyst as in Example 1, the LHSV was increased to 3.5 (350 ml./hr. per 100 ml. of catalyst).

The yield of 2,6-xylenol, initially about 28 wt. %, rapidly declined to 5 wt. % in 60 hours. The rapid decline in percent conversion of phenol to 2,6-xylenol in this run versus the steady conversion seen in Example 1 demonstrates the need to add water to the feed.

If toluene and water both are omitted from the feed, the decline in conversion is even more rapid.

In both cases the runs are not carried beyond 60 and 30 hours, respectively, because no more 2,6-xylenol — the desired product — is being formed.

EXAMPLE 4

The procedure of Example 1 is repeated, substituting one-half the phenol with an equimolar amount of o-cresol and reducing the water content to 11.6 moles/4 moles of methanol and phenolic compounds combined.

After 500 hours, the product distribution is as follows:

| | |
|---|---|
| Total phenol (wt. %) | 23.0 |
| o-cresol | 48.0 |
| 2,6-xylenol | 28.4 |
| 2,4,6-mesitol | 0.6 |

The results in these examples demonstrate that the present process provides:

A significant increase in catalytic activity by impregnating magnesium oxide with ammonium molybdate to about 5 wt. %. This increase in activity is seen in the range of 430°–450°C., which is well below the prior art operating temperatures of about 525°–550°C.;

A considerable increase in catalyst life. Whereas the prior art catalyst expires and needs regeneration after about 70 to 90 hours, the catalyst according to this invention shows only a small decrease in activity after 500 hours;

A reduction in the operating temperature which can provide a substantial decrease in the corrosion of the reactor tubes; and An increase in selectivity for di-ortho-alkylation.

EXAMPLE 5

The procedure of Example 1 is repeated, substituting for ammonium para-molybdate, stoichiometrically equivalent quantities of molybdenum dioxide, $MoO_2$, molybdenum trioxide, $MoO_3$, molybdenum sesquioxide, $Mo_2O_3$, and of sodium molybdate $Na_2(MoO_4)$, potassium bimolybdate, $K_2Mo_2O_7$, calcium molybdate, $CaMoO_4$, magnesium molybdate, $MgMoO_4$, bismuth molybdate, $Bi_2(MoO_4)_3$ and lead molybdate, $PbMoO_4$. Substantially the same results are obtained.

EXAMPLE 6

The procedure of Example 1 is repeated, substituting for the methanol stoichiometrically equivalent amounts of the following alkanols: ethyl, propyl, n-butyl, isopropyl, isobutyl, tertiary butyl, n-amyl and n-hexyl. There are obtained, respectively, phenols, mono- and di-ortho-substituted with ethyl, propyl, n-butyl, isopropyl, isobutyl, tertiary butyl, n-amyl and n-hexyl groups.

EXAMPLE 7

The procedure of Example 1 is repeated substituting for the phenol, stoichiometrical amounts of the following phenolic compounds with at least one ortho-hydrogen:
o-cresol;
m-cresol;
p-cresol;
3,5-xylenol; and
2-phenylphenol The predominating products are, respectively,
2,6-xylenol;
2,3,6-trimethylphenol;
2,4,6-trimethylphenol;
2,3,5,6-tetramethylphenol; and
2-methyl-6-phenylphenol.

Similarly, after substituting for phenol the following phenolic compounds:
2,3-xylenol;
2,4-xylenol;
2,5-xylenol;
2,3,4-trimethylphenol;
2,3,5-trimethylphenol;
3,4,5-trimethylphenol;

2,3,4,5-tetramethylphenol;
4-phenylphenol;
2-tolylphenol;
2,4-diphenylphenol;
2,3-diphenylphenol;
2-xylylphenol;
2-mesitylphenol;
2-durylphenol;
4-methyl-2-phenylphenol;
2-tolyl-4-phenylphenol;
2-phenyl-4-tolylphenol; and
3-methyl-5-phenylphenol in the procedure of Example 1 there are obtained the corresponding mono-ortho-methylated and di-ortho-methylated phenols, depending on whether one or two of the ortho-positions is unsubstituted in the starting material.

Although the above examples have shown various modifications and variations of the present invention, other modifications and variations are possible in light of the above teachings. It is therefore to be understood that changes may be made in the particular embodiments of the invention described which are within the full intended scope of the invention as defined by the appended claims.

I claim:

1. A process for the ortho-alkylation of a phenolic compound of the general formula:

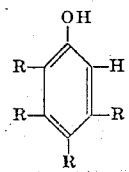

wherein each R is a monovalent substituent selected from hydrogen, 1-12 C alkyl, 1-12 C aryl and 1-12 C alkylaryl, said process comprising reacting said phenolic compound with an alkanol in the presence of water and a catalytic amount of a catalyst consisting of not less than about 2 percent by weight of a catalytically-active compound selected from the group consisting of molybdenum oxide and alkali metal, alkaline earth metal, lead bismuth and ammonium salts of molybdic acid in admixture with magnesium oxide, in the vapor phase at a temperature of from about 200°C to about 600°C.

2. A process as defined in claim 1 wherein said phenolic compound is of the general formula

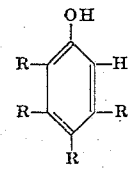

wherein each R is a monovalent substituent selected from the group consisting of hydrogen, methyl, phenyl and methyl-substituted phenyl.

3. A process as defined in claim 2 wherein each R is hydrogen.

4. A process as defined in claim 3 wherein the ratio of alkanol to phenolic compound is at least two moles of alkanol per mole of phenolic compound.

5. A process as defined in claim 1 wherein said catalytically-active compound is molybdenum oxide.

6. A process as defined in claim 1 wherein said catalytically-active compound is ammonium para-molybdate.

7. A process as defined in claim 1 wherein the alkanol is a (lower)alkanol of up to 6 carbon atoms.

8. A process as defined in claim 9 wherein said (lower)-alkanol is methanol.

9. A process wherein phenol is reacted with methanol in the presence of water and a catalytic amount of at least 2 percent by weight of ammonium para-molybdate in admixture with magnesium oxide, in the vapor phase, at a temperature of from about 200°C to about 490°C, to produce 2,6-xylenol.

10. A process as defined in claim 9 wherein the ratio of methanol to phenol is at least two moles of methanol per mole of phenol.

11. A process as defined in claim 10 wherein said temperature is from about 430° to about 450°C.

12. A process as defined in claim 11 wherein the water comprises from about 10 to about 75 percent by volume based on the combined volume of phenol, methanol and water.

13. A process as defined in claim 9 wherein the ammonium para-molybdate in admixture with magnesium oxide has been calcined before being contacted with phenol and methanol.

14. A process as defined in claim 13 wherein the calcined admixture contains from about 2 to about 10 percent by weight of molybdenum values.

15. A process for the ortho-alkylation of a phenolic compound of the general formula:

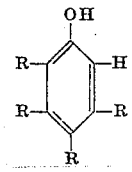

wherein each R is a monovalent substituent selected from hydrogen, 1-12 C alkyl, 1-12 C aryl and 1-12 C alkylaryl, said process comprising reacting said phenolic compound with an alkanol in the presence of water and a catalytic amount of a catalyst consisting of not less than about 2 percent by weight of molybdenum oxide or ammonium para-molybdate in admixture with magnesium oxide, in the vapor phase at a temperature of from about 200°C to about 490°C.

16. A process as defined in claim 15 wherein said mixture of magnesium oxide and said catalytic compound has been calcined prior to being contacted with said phenolic compound and said alkanol.

* * * * *